US005468538A

United States Patent [19]

Nameche

[11] Patent Number: 5,468,538

[45] Date of Patent: Nov. 21, 1995

[54] PAINT MASKING KIT FOR WINDOWS AND METHOD OF USING SAME

[76] Inventor: Paul W. Nameche, 14 Lake Rd., Magnolia, Mass. 01930

[21] Appl. No.: 177,431

[22] Filed: Jan. 5, 1994

[51] Int. Cl.[6] .................... B32B 9/00

[52] U.S. Cl. .................... 428/101; 428/14; 428/33; 428/42; 428/76; 428/99; 428/137; 428/192; 428/195; 428/352; 428/518; 156/108; 118/301; 118/406; 118/504; 52/202; 52/211; 52/741.3; 16/250

[58] Field of Search .................... 428/99, 42, 137, 428/914, 195, 352, 518, 14, 33, 76, 192; 118/301, 406, 504; 52/202, 211, 823; 156/108; 16/250

[56] References Cited

U.S. PATENT DOCUMENTS

| | | | |
|---|---|---|---|
| 3,130,455 | 4/1964 | Borlenghi . | |
| 3,335,703 | 8/1967 | Buehler | 118/504 |
| 3,478,478 | 11/1969 | Luebs | 52/309 |
| 4,195,550 | 4/1980 | Herrington | 118/505 |
| 4,768,320 | 9/1988 | Weller | 52/211 |
| 4,898,758 | 2/1990 | Lipson | 428/99 |
| 5,107,643 | 4/1992 | Swensen | 52/202 |
| 5,224,240 | 7/1993 | Smith et al. | 16/251 |

*Primary Examiner*—Patrick J. Ryan
*Assistant Examiner*—Abraham Bahta
*Attorney, Agent, or Firm*—Wolf, Greenfield & Sacks

[57] ABSTRACT

A paint masking kit for windows and a method of masking windows prior to painting. The paint masking kit for windows includes a container having a plurality of reusable window balance covers having predetermined sizes and shapes for covering a header and balance portions of a window and a predetermined amount of a plastic sheet material for covering the glass portions of the window. The method of paint masking a window, having an upper and lower sash portion, a header and balances, includes raising the lower sash portion to expose the lower half of the balances. The reusable window balance covers are then secured to the exposed lower balance portions, and the lower sash portion is lowered over the window balance covers. Next, the upper sash portion is lowered to expose the header and the upper half of the balances. Reusable window balance covers are secured to the exposed header and balance portions, and the upper sash portion is raised over the window balance covers. Lastly, the plastic sheet material is applied over glass portions of the window.

29 Claims, 2 Drawing Sheets

PAINT MASKING KIT FOR WINDOWS AND METHOD OF USING SAME

BACKGROUND OF THE INVENTION

1. Field of the Invention

The present invention relates to painting accessories and, more particularly, to a method of masking windows prior to painting with a paint masking kit for windows including reusable window balance covers and window glass cover material.

2. Description of the Prior Art

In painting a house, apartment building or other structures having windows, painters have experienced difficulty painting frames around window glass neatly and efficiently. Furthermore, after painting, window frames frequently become stuck in an open or closed position due to the inadvertent painting of the window's header and balances, or guide members. The problem of protecting the windows, particularly the window balances, header, and window glass, from being painted, splattered, or smudged has traditionally been solved primarily by applying adhesive masking tape to these window parts prior to painting. Pre-cut masking tape, and various other hand-held paint masks, work suitably, but are not reusable, and take time to apply, remove, and/or use accurately.

It is therefore an object of this invention to provide a means for protecting windows and their balances against paint smears and paint spray while painting.

Another object of the invention is to provide a paint masking kit for windows including covers for window balances and glass portions.

It is a further object of this invention to provide reusable window balance covers.

SUMMARY OF THE INVENTION

Accordingly, the present invention provides a paint masking kit for windows and a method of masking windows prior to painting. The paint masking kit for windows includes a container having a plurality of reusable window balance covers having predetermined sizes and shapes for covering a header and balance portions of a window and a predetermined amount of a sheet material for covering the glass portions of the window.

In one embodiment of the invention, the reusable window balance covers are molded to substantially conform with guide members in the window's header and balances. The covers are typically molded from a durable, chemical-resistant, semi-rigid plastic material such as polyvinyl chloride. The sheet material for covering the glass portions of the window is typically a vinylic material, such as polyvinyl chloride containing a plasticizer, which can be removably adhered to a glass or thermoplastic window.

The method of paint masking a window, having an upper and lower sash portion, a header and balances, includes raising the lower sash portion to expose the lower half of the balances. The reusable window balance covers are then secured to the exposed balance portions, and the lower sash portion is lowered over the window balance covers. Next, the upper sash portion is lowered to expose the header and upper half of the balances. Reusable window balance covers are secured to the exposed header and balance portions, and the upper sash portion is raised over the window balance covers. Lastly, the sheet material is applied over the glass portions of the window.

Other objects and features of the present invention will become apparent from the following detailed description when taken in connection with the following drawings. It is to be understood that the drawings are designed for the purpose of illustration only and are not intended as a definition of the limits of the invention.

BRIEF DESCRIPTION OF THE DRAWINGS

The foregoing and other objects and advantages of the invention will be appreciated more fully from the following drawings in which.

DETAILED DESCRIPTION OF THE INVENTION

Figure 1:
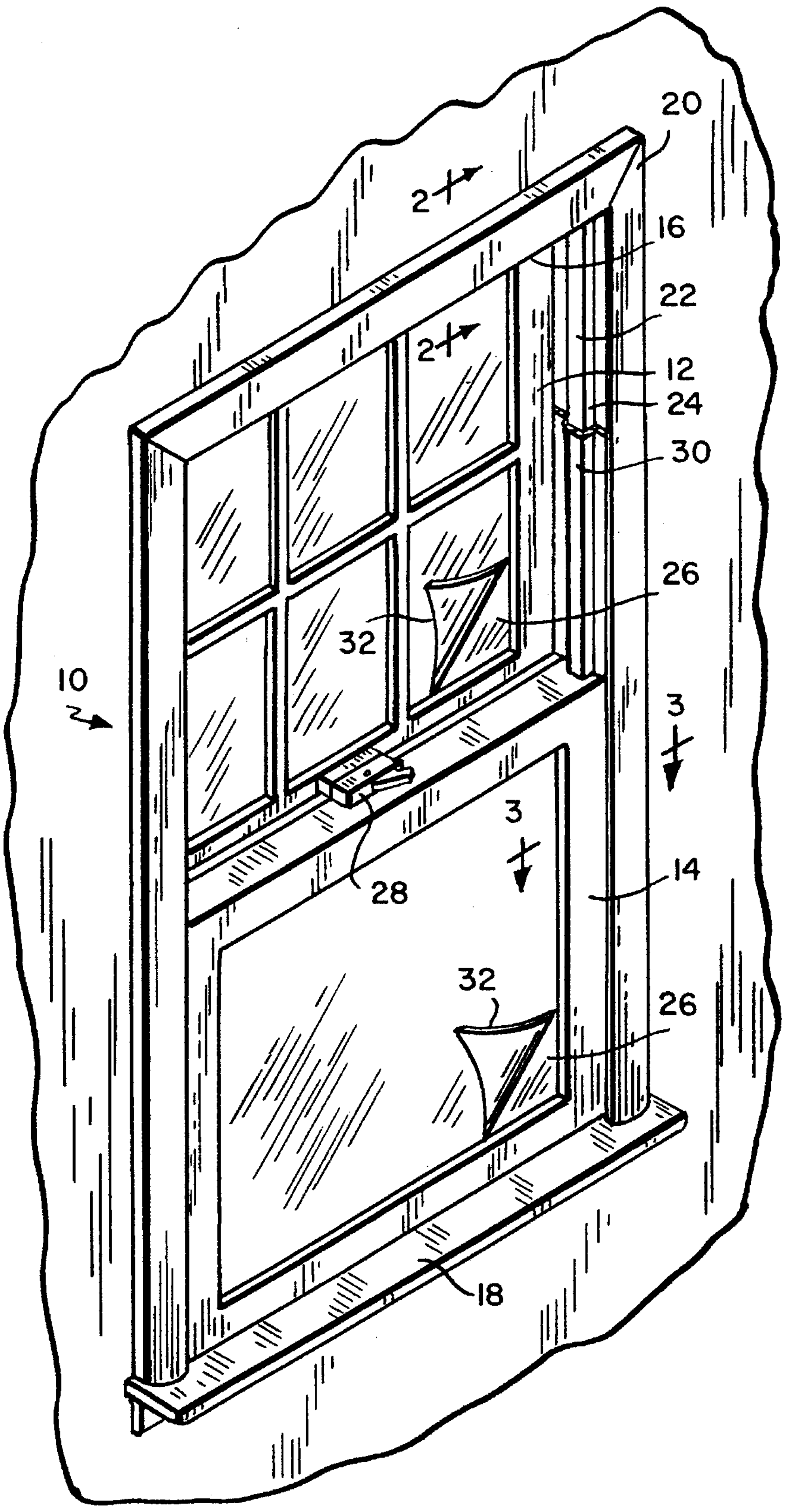
FIG. 1 is a perspective view of a conventional window with the window balance covers and window glass cover material of the present invention in place prior to painting the window.

Referring now to the drawings, in which like reference numerals designate like or corresponding parts throughout the several views, there is shown in FIG. 1 a conventional window 10, including an upper sash 12, a lower sash 14, a header 16, and a sill 18. All conventional windows also include two side portions which include tracks and/or channels, which are mated with the upper and lower sash side portions 12, 14. This relationship allows the upper and lower sash portions to be slidable relative to one another while maintaining their placement within a window frame 20. The track and channel portions of frame 20 are typically known as the window balances 22. As shown in FIG. 1, and as noted above, balances 22 include guide members 24.

Conventional windows, for commercial and residential use, typically include a transparent window glass portion(s) 26, that is framed within the upper and lower sash portions 12, 14. It is noted that other materials can be used in place of window glass to provide a clear, shatterproof window. These glass alternatives typically include transparent, weather-resistant thermoplastic materials, including polycarbonate, polyvinyl chloride, polymethyl methacrylate, and the like. One such glass alternative is Plexiglas® material (a trademark of Rohm and Haas Company, Philadelphia, Pa.). Lastly, window 10 can include a lock 28 for preventing movement of the upper and lower sash portions.

As shown in FIG. 1, reusable window balance cover 30 is installed over balance 22. A similar cover is provided over header portion 16 (not shown). Lastly, plastic sheet material 32 is provided for covering glass portions 26 of window 10.

Once the window balance and glass covers 30, 32 are installed, the window can be painted without spotting the window glass or the window header 16 and balances 22. After use, the reusable balance cover 30 can be easily removed, and the window glass cover material 32 can be easily peeled off of window glass 26. The present invention, therefore, provides a neat and efficient device for painting windows without splattering the window glass 26 or inadvertently painting the window header 16 and balances 22, which can make windows stick in an open or closed position.

Figure 2:
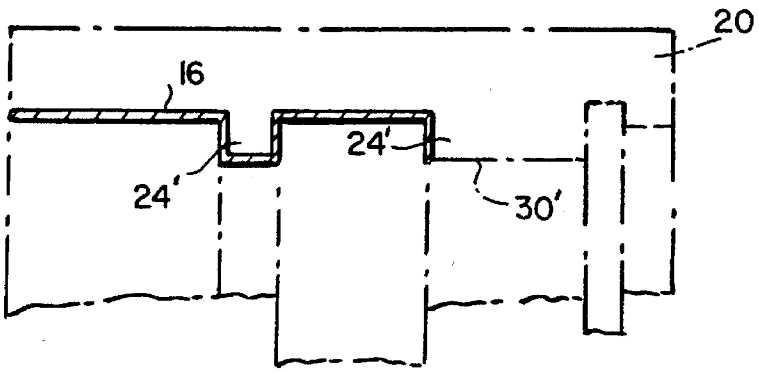
FIG. 2 is a cross-sectional side view of the top portion of a conventional window frame with the window balance cover in place, taken along section line 2—2 of FIG. 1.

Referring now to FIGS. 2–6, window balance covers 30 are shown in greater detail. FIG. 2 is a cross-sectional side view of the top portion of frame 20, including header 16 taken along section line 2—2 of FIG. 1. Window balance cover 30' is shown substantially conforming with guide members 24' in header 16.

Figure 3:
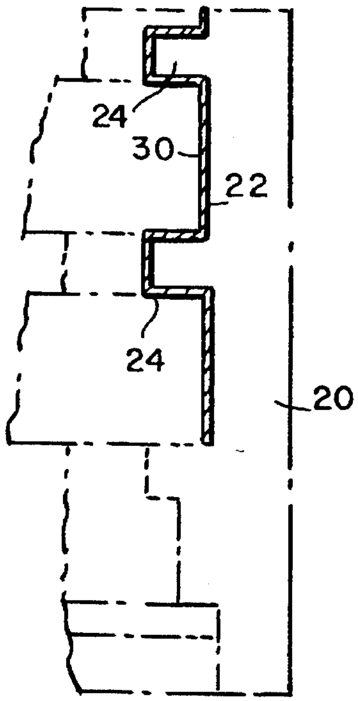
FIG. 3 is a cross-sectional side view of the side portion of a conventional window frame with the window balance cover in place, taken along section line 3—3 of FIG. 1.

FIG. 3 shows a cross-sectional side view of the side portion of frame 20, including balance 22 taken along section line 3—3 of FIG. 1. Window balance cover 30 is shown substantially conforming with guide members 24 of balance 22.

Figure 4:
FIG. 4 is one embodiment of a window balance cover for the header portion of a window frame.
Figure 5:
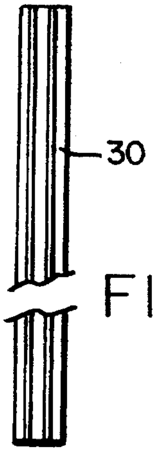
FIG. 5 is one embodiment of a window balance cover for a side portion of a window frame.
Figure 6:
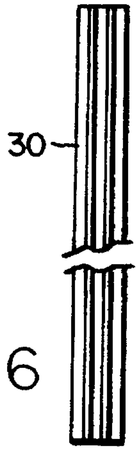
FIG. 6 is another embodiment of a window balance cover for a side portion of a window frame.

FIGS. 4, 5 and 6 show portions of window balance covers for a window's header and balance portions 30' and 30, respectively. As noted above, the window balance covers are reusable and are molded to substantially conform with guide members in the window headers and balances. Typically, the reusable window balance covers 30, 30' are molded from a chemical-resistant, durable, semi-rigid plastic material. Preferably, window balance covers 30, 30' are made from a plastic material such as high density polyethylene, polypropelene, nylon, polyvinyl chloride, and the like. Most preferably, polyvinyl chloride is molded to form the reusable window balance covers due to its relative availability, low cost, durability, and resistance to a variety of paint types such as latex and oil based paints. The reusable window balance covers can be provided in a wide variety of lengths, and can be overlapped, if necessary, to cover an entire header and/or balance portion. Typically, the reusable window balance covers have a thickness of between about 0.005 inch and about 0.015 inch; preferably, the cover's thickness is about 0.012 inch to provide enough rigidity to maintain the molded shape, while being flexible enough to be inserted between the upper and/or lower sash and the window balance. It has also been found that the window balance covers thickness should allow for the window to be slid into place over the window balance cover, while providing space for paint to enter between the cover and the window sash side portion.

The reusable window balance covers 30, 30', although molded to substantially conform with guide members 24, 24' in the window header 16 and balances 22, can also utilize a fastener material for securing the covers to the window portions. This material can be any commercially available fastener, such as a tape, a tack, or a weak adhesive, a putty-like material, and the like. Preferably, the reusable window balance covers use an adhesive strip along one side to secure the covers against the window header and balances. For example, double-back tape, such as 3M® tape (trademark of 3M Corporation, St. Paul, Minn.) can be used for securing the reusable covers.

The plastic sheet material 32 for covering the glass portion 26 of window 10 can be any chemical-resistant, clear plastic sheet material which can be removably adhered to a glass or thermoplastic window (as shown in FIG. 1). Preferably, the plastic sheet material 32 is a transparent, vinylic sheet material, which can be provided in a roll or sheet form and be cut to fit any size and shape window glass. A most preferred vinylic sheet material is a polyvinyl chloride which provides chemical/paint resistance and is durable and cost efficient. The polyvinyl chloride sheet material also provides a clear covering which lets outside light into a room which may help a painting contractor, especially in new construction, when no other light source is available. Preferably, the plastic sheet material has a thickness of between about 0.002 inch and about 0.001 inch; most preferably, the sheet has a thickness of between about 0.003 inch and about 0.0045 inch which allows for a user to pull and stretch the material into corners without tearing, while providing enough strength to prevent paint sprayed onto the window from penetrating to the window glass. Typically, the plastic sheet material contains a conventional plasticizer, such as ethylene glycol and its derivatives or phthalates to provide, maintain or enhance softness and pliability of the plastic sheet. Preferably, a phthalate-type plasticizer is used due to its effectiveness. The most preferred sheet material, made from polyvinyl chloride containing a plasticizer, has a tensile strength of between about 2200 psi and about 4300 psi, and an elongation of at least about 200% using ASTM Test Method D-882. The plastic sheet material can also include an adhesive on one side for removably attaching the material to the window glass before painting. The adhesive material can be any conventional adhesive such as a latex adhesive, a polyvinyl adhesive, a vinyl acetate material, and the like. Preferably, the adhesive material is a vinyl acetate-type material which has enough tackiness to secure the sheet material on the glass, while allowing the user to easily remove and/or adjust the sheet.

Figure 7:
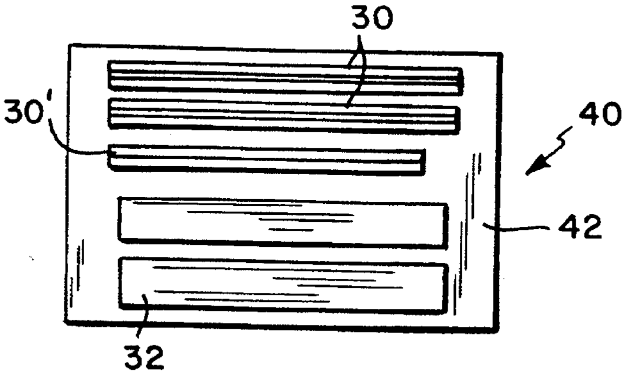
FIG. 7 illustrates the component items of the paint masking shield kit for windows of the present invention as supplied in a conventional-type container.

Referring now to FIG. 7, a paint masking kit 40 is shown. Kit 40 includes a container 42 for holding the kit components. A plurality of reusable window balance covers 30, 30', having predetermined sizes and shapes for covering a header and balance portions of a window, and a predetermined amount of a plastic sheet material 32 for covering the glass portions of the window are provided in container 42. As noted, kit 40 provides reusable balance covers 30, 30' having predetermined sizes and shapes, as well as a predetermined amount of plastic sheet material 32. It is noted that kits can be individually prepared for use with either a double-hung tilt-down window or a double-hung weighted window. A tilt-down window has a balance portion which can be pushed in, allowing for the upper or lower sash portion to be tilted into a room for cleaning and/or replacement. A weighted window is a two-piece movable window with cords attached to the upper and lower sash portions of the window at one end and a weight at the other end to balance the window's movement. Specific kits can be provided for a variety of window types, including the double hung tilt-down window or double hung weighted window. Moreover, kits can be prepared for well-known brands of windows, including Andersen® windows (trademark of Andersen Corp., Bayport, Minn.), Marvin® windows (trademark of Marvin Windows, Minneapolis, Minn.), Pella® windows (trademark of Pella Windows & Doors, Pella, Iowa), and the like.

In operation, the paint masking kit 40 can be used on a conventional window 10, having an upper and lower sash portion 12, 14, header 16 and balances 22. The lower sash portion 14 is first raised to expose the lower half of balances 22. The reusable window balance covers 30 are then secured to the exposed balance 22, and the lower sash 14 is lowered over covers 30. Next, upper sash 12 is lowered to expose header 16 and the upper half of balance 22. Reusable window balance covers 30' and 30 are then secured to the exposed header 16 and balance 22, respectively. Upper sash 12 is then raised over window balance covers 30', 30. If desired, sheet material 32 can be applied over glass portion 26 of window 10 by pressing the plastic sheet over the window glass and using a knife or the like to trim the material at the corners, to expose the window frame for painting.

After the window has been painted, the plastic sheets 32 can be easily peeled off of the window and discarded while the reusable balance covers can be cleaned with any commercially solvent or water and reused for a similar type of window.

Although particular embodiments of the invention have been described in detail for purposes of illustration, various modifications may be made without departing from the spirit and scope of the invention. Accordingly, the invention is not to be limited except as by the appended claims.

What is claimed is:

1. A paint masking kit for windows, comprising:

a container including a plurality of reusable window balance covers having predetermined sizes and shapes for covering a header and balance portions of a window; and a predetermined amount of a plastic sheet material for covering glass portions of said window.

2. The kit of claim 1, wherein said plurality of reusable window balance covers are molded to substantially conform with guide members in said window header and balances.

3. The kit of claim 2, wherein said plurality of reusable window balance covers are molded from a chemical-resistant, durable, semi-rigid plastic material.

4. The kit of claim 3, wherein said semi-rigid plastic material is polyvinyl chloride.

5. The kit of claim 1, wherein said plurality of reusable window balance covers have a thickness of between about 0.005 inch and about 0.015 inch.

6. The kit of claim 1, wherein said plurality of reusable window balance covers include means for securing said covers against said window header and balances.

7. The kit of claim 6, wherein said means for securing said covers against said window header and balances is an adhesive strip.

8. The kit of claim 1, wherein said plastic sheet material has a thickness of between about 0.002 inch and about 0.010 inch.

9. The kit of claim 8, wherein said plastic sheet material is a transparent, vinylic sheet material.

10. The kit of claim 9, wherein said vinylic sheet material is polyvinyl chloride.

11. A set of reusable window balance covers for use during painting of a window frame, comprising:

a plurality of covers having predetermined sizes and shapes for covering header and balance portions of a window, said covers being molded to substantially conform with guide members in said window header and balances.

12. The covers of claim 11, wherein said covers are molded from a chemical-resistant, durable, semi-rigid plastic material.

13. The covers of claim 12, wherein said semi-rigid plastic material is polyvinyl chloride.

14. The covers of claim 11, wherein said covers have a thickness of between about 0.005 inch and about 0.015 inch.

15. The covers of claim 11, wherein said covers include an adhesive strip for securing said covers against said window header and balances.

16. A plastic sheet material for covering glass portions of a window having an adhesive on one side thereof for removably attaching said sheet material to said glass, wherein said sheet material is made from polyvinyl chloride, and said sheet material has a thickness of between about 0.002 inch and about 0.01 inch, a tensile strength of between about 2200 psi and about 4300 psi, and an elongation of at least about 200%.

17. The plastic sheet material of claim 16, wherein said polyvinyl chloride sheet material includes a phthalate plasticizer material.

18. The plastic sheet material of claim 16 wherein said adhesive is a vinyl acetate material.

19. A method of paint masking a window, having an upper and lower sash portion, a header and balances, comprising:

raising said lower sash portion to expose the lower half of said balances;

securing reusable window balance covers to said exposed balance portions;

lowering said lower sash portion over said window balance covers;

lowering said upper sash portion to expose said header and the upper half of said balances;

securing reusable window balance covers to said exposed header and balance portions; and raising said upper sash portion over said window balance covers, wherein said reusable window balance covers substantially conform with guide members in said window header and balance portions.

20. The method of claim 19 further including the step of applying a plastic sheet material over glass portions of said window.

21. The method of claim 19 wherein said reusable window balance covers are molded from a chemical-resistant, durable, semi-rigid plastic material.

22. The method of claim 21 wherein said semi-rigid plastic material is polyvinyl chloride.

23. The method of claim 19 wherein said reusable window balance covers have a thickness of between about 0.005 inch and about 0.015 inch.

24. The method of claim 19 wherein said reusable window balance covers include an adhesive strip for securing said covers against said window header and balance portions.

25. The method of claim 20, wherein said plastic sheet material has a thickness of between about 0.002 inch and about 0.010 inch.

26. The method of claim 25 wherein said plastic is a transparent, vinylic sheet material.

27. The method of claim 26 wherein said vinylic sheet material is polyvinyl chloride.

28. A paint masking kit for windows, comprising:

a container including a plurality of reusable window balance covers, said covers being molded from a chemical-resistant, durable, semi-rigid plastic material to substantially conform with guide members in a header and balance portions of a window, wherein said plurality of reusable window balance covers have a thickness of between about 0.005 inches and about 0.015 inches; and a predetermined amount of a vinylic sheet material for covering glass portions of a window having an adhesive on one side thereof for removably attaching said sheet material to said glass, wherein said sheet material has a thickness of about 0.002 inches and about 0.01 inches, a tensile strength of between about 2,200 psi and about 4,300 psi, and an elongation of at least about 200%.

29. A method of paint masking a window, having an upper and lower sash portion, a header and balances, comprising:

providing a plurality of reusable window balance covers molded from a chemical-resistant, durable, semi-rigid plastic material to substantially confirm with guide members in said window header and balances;

raising said lower sash portion to expose the lower half of said balances;

securing said reusable window balance covers to said exposed balance portions;

lowering said lower said sash portion over said window balance covers;

lowering said upper sash portion to expose said header and the upper half of said balances;

securing said reusable window balance covers to said exposed header and balance portion;

raising said upper sash portion over said window balance covers;

providing a plastic sheet material for covering glass portions of said window having an adhesive on one side thereof for removably attaching said sheet material to said glass; and applying said plastic sheet material over said glass portions of said window and trimming said sheet material to expose frame portions to be painted.

* * * * *